July 2, 1929.　　　　L. A. WALES　　　　1,719,150
CONSTRUCTION OF VEHICLE BODIES
Filed June 8, 1928
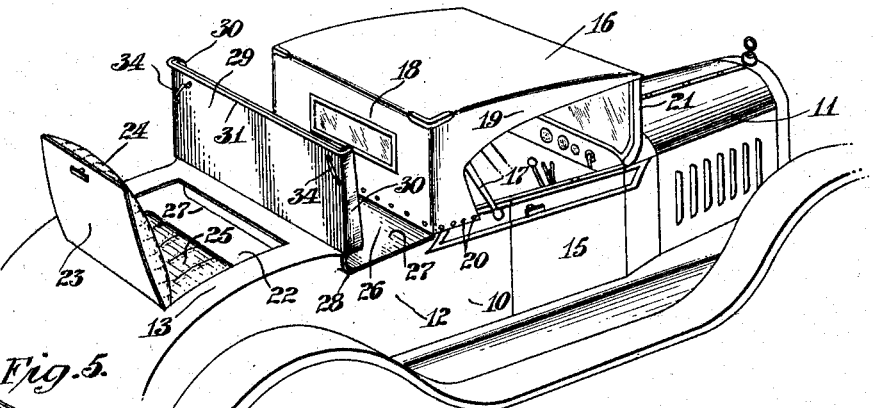
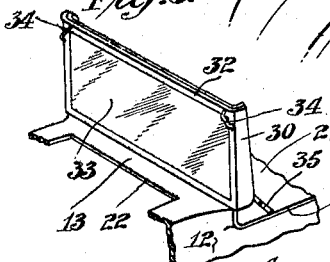
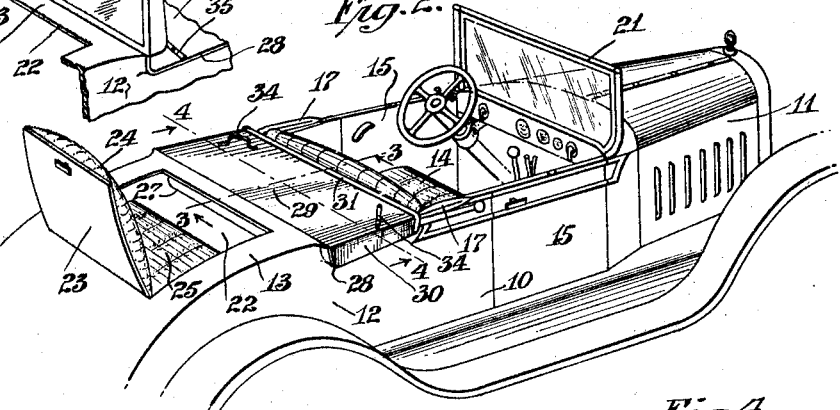
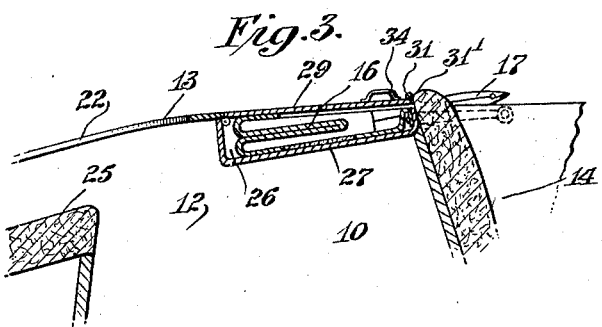
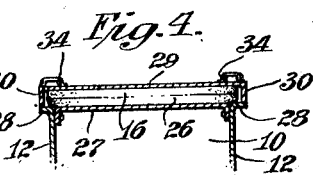

Patented July 2, 1929.

1,719,150

UNITED STATES PATENT OFFICE.

LEONARD A. WALES, OF NEW YORK, N. Y.

CONSTRUCTION OF VEHICLE BODIES.

Application filed June 8, 1928. Serial No. 283,791.

This invention relates to improvements in vehicle bodies and has particular reference to the construction of a roadster tonneau wherein space is provided below the deck immediately behind the driver's seat to accommodate the top in its folded position.

My invention has for its principal object to provide a roadster body with a pocket immediately in the rear of the driver's seat to accommodate the ordinary top in its folded or closed position and further to afford a hinged cover for the pocket to entirely enclose the top and to lie flush with rear deck of the car in closed position.

Briefly, the present invention is particularly applicable to a roadster body utilizing the rear portion of the tonneau to accommodate a rumble seat. Ordinarily when the rumble seat is open and being occupied the top for the driver's seat is up and as a consequence the only communication to be had between those in the driver's seat and the rumble seat is through the rear window. To drop the top between the two seats is still more objectionable for the passengers in the rumble seat. To overcome such objections the present invention comprehends a pocket or compartment between the openings for the driver's seat and rumble seat into which the top may be completely folded, and a hinged cover which closes flush with the deck of the car and entirely conceals the top.

I have illustratively exemplified one embodiment of my invention in the accompanying drawings, in which, Figure 1 is a perspective view of a roadster body showing the top up and the lid of the compartment or pocket raised to receive the top; Figure 2 is a similar perspective view showing the lid of the compartment closed over the folded top which is inside of the compartment; Figure 3 is a substantially longitudinal sectional view taken on line 3—3 of Figure 2 and showing the top in folded position and the lid closed thereover; Figure 4 is a substantially transverse sectional view of the portion of the tonneau in which the compartment is formed, the view being taken on line 4—4 of Figure 2; and Figure 5 is a modified construction in which the cover or lid for the compartment is utilized as a wind shield for the rumble seat.

Referring to the drawings in detail, 10 denotes the body portion of a roadster comprising a hood 11, sides 12 and rear deck 13. Forward of the deck 13 and rearwardly of the hood is the space for the driver's seat 14. The sides 12 are provided with doors 15 to afford access to the space occupied by the driver's seat 14. The top 16 for the driver's seat comprises the usual type of covering having a collapsible frame 17, the side arms of which are pivoted to the sides 12 just rearwardly of the openings for the doors 15. The frame 17 is covered with material which is cut to provide an overhead portion, back or rear curtain 18 and brief side portions 19, the lower ends of the latter being connected to the sides 12 by separable fastening means 20, as illustrated in Figure 1. When in its up position the front of the frame 17 is removably attached to the top rail of an upright wind shield 21 of any standard construction.

At the extreme rear portion of the deck 13 an opening 22 is provided, the latter having a cover 23 hinged at the rear thereof and provided with a back rest 24 associated with a seat 25 which is disposed in the space beneath the deck 13 and together with the back rest 24 forms what is known as a rumble seat.

Between the forward edge of the rumble seat opening and the back of the driver's seat, there is usually quite some deck space to accommodate the top when it is down in folded position. According to the present invention this portion of the deck between the two openings is cut away and the deck lowered to provide a pocket or compartment 26, the bottom or floor 27 thereof being a separate plate permanently attached at its sides to the inner sides of the side walls 12, which at the level of the floor 27 are turned outwardly beyond their normal upright line to form flanges 28, as illustratively exemplified particularly in Figure 4. The flanges 28 are provided to act as supports for the side arms of the frame 17 when the latter are folded, as shown in Figure 2, since in arrangements of this character the arms are usually pivoted on the outside of the two sides 12. It is intended that the compartment 26 will be constructed with enough depth below the level of the deck 13 to accommodate the entire top and its frame in closed or folded position and in order to conceal the folded top and to carry out the general line of the deck 13, I provide a cover 29 comprising a plate hinged at its rear edge to the deck 13 and having depending skirt portions 30 along its shorter or longitudinal sides which when the cover 29 is closed are flush with the outside line of the flanges 28 and entirely enclose the side arms of the frame 17. The free forward end of the cover 29 carries a bead 31 which contacts with a lip portion 31' of the back of the driver's seat and which therefore forms a weather tight joint at this point. In Figures 3 and 4 of the drawings the top is clearly illustrated in its folded position with the cover 29 closed thereover. It will be understood of course that slight modifications may be required to accommodate the present invention to the many different makes and styles of roadsters now being produced, but the invention is built into the tonneau at the time the body is being manufactured and any problems of this character may be readily adjusted in production.

It has been found that the lid or cover 29, being disposed directly in front of the rumble seat, may in its raised or upright position be utilized as a wind shield for those occupying the rear seat and in order not to obstruct their view the cover, as illustrated in Figure 5, comprises a frame 32 embracing a sheet of plate glass 33.

Suitable handles 34 are attached to the cover at convenient places to afford easy facilities for lifting the hinged member to its open and closed positions. The cover is in addition held open by suitable hardware 35.

Having now described my invention, what I claim and desire to secure by Letters Patent is:

A vehicle body comprising side walls and a deck provided with an opening for the driver's seat and a depression immediately in the rear of the seat, said depression being open at its sides and formed by the side wall being turned outwardly to form flanges, a bottom, front and rear wall attached to the sides of the body just below the flanges, a folding top pivoted to the sides of the body and comprising a frame the side arms of which are supported on the flanges when the top is folded within the depression, and a hinged cover comprising a plate having depending skirt portions to be disposed over the said side arms of the top in folded position and to rest on and flush with the outer ends of the flanges.

In testimony whereof I affix my signature.

LEONARD A. WALES.